UNITED STATES PATENT OFFICE.

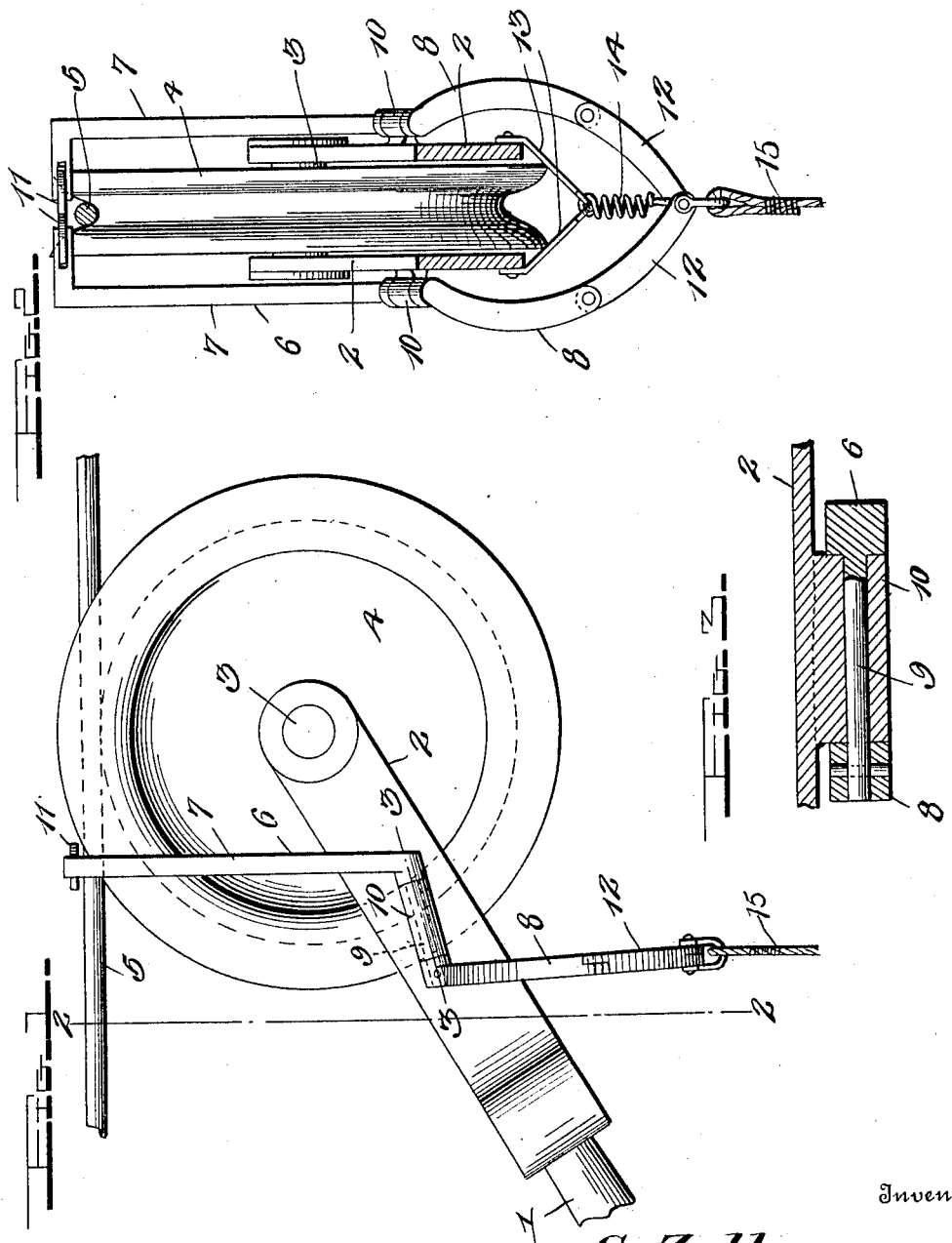

GEORGE ZELLER, OF ISSAQUAH, WASHINGTON.

TROLLEY-GUARD.

1,048,260.  Specification of Letters Patent.  Patented Dec. 24, 1912.

Application filed May 29, 1912. Serial No. 700,508.

*To all whom it may concern:*

Be it known that I, GEORGE ZELLER, a citizen of the United States, residing at Issaquah, in the county of King and State of Washington, have invented certain new and useful Improvements in Trolley-Guards, of which the following is a specification, reference being had to the accompanying drawings.
This invention relates to new and useful improvements in trolley guards and the primary object thereof is to provide a guard or clamp for retaining the trolley wheel on the wire, while the car is in motion and which guard or clamp is not adapted for casual disengagement.

A further object of the invention resides in providing a pair of arms pivotally connected intermediate of their ends to the side faces of the trolley harp, which arms are adapted to project over the trolley wheel and retain the wire in the groove thereof.

A further object of the invention resides in providing linking members having pivotal connection with one another and the lower ends of the respective arms, said linking members also having connection with a spring member arranged to normally dispose said arms to their clamping or effective positions.

Still another object of the invention resides in providing a device which is extremely simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawing forming a part of this application, Figure 1 is a side elevation showing my improved device applied to use. Fig. 2 is a section as seen on line 2—2, Fig. 1. Fig. 3 is a section therethrough as seen on line 3—3, Fig. 1.

In describing my invention, I shall refer to the drawing in which similar reference characters designate corresponding parts throughout the several views and in which—

1 indicates a trolley pole which is adapted to be carried on a car (not shown) and has the outer end thereof provided with the usual or any preferred form of trolley harp 2 between which is journaled a spindle 3.

This spindle carries the usual trolley wheel 4 which is adapted to contact with the conductor 5 and in order to retain said wheel in its proper engagement with said conductor or trolley throughout the movement of the car, I provide my improved guard. This guard comprises a pair of arms 6, each of which is formed of a pair of angular sections 7 and 8, which sections are connected together by an intermediate pin or member 9. These intermediate or connecting members 9 are journaled in bearings 10 carried on the outer side faces of the harp 2, thereby pivotally mounting said arms 6 to the harp, and when so positioned, the upper ends of the sections 7 extend to points above the trolley 5, while the sections 8 depend below the wheel 4. The extreme upper ends of the sections 6 are bent inwardly toward one another and have rotatably mounted therein the rollers 11 which are adapted to contact with one another when the arms ars swung in one position to form a cover or the like for the groove in the wheel 4, whereby the latter may be kept engaged with the conductor 5. The lower sections 8 of the arms 6 are slightly curved or bulged outwardly and the lower ends of the same have pivotally connected thereto the respective ends of a pair of links 12, which links are also pivoted at their opposite ends to one another.

Secured to the arms of the trolley harp 2 are the ends of the arms of a substantially V-shaped member 13 which depends therefrom in substantial alinement with the sections 8 of the arms 6 and the apex of this member 13 has connected therewith, the one end of a coil spring 14. The opposite end of this coil spring 14 is engaged with the point of pivotal connection between the linking members 12 and it will be appreciated that the normal tendency of the spring is to draw upwardly upon the linking members, whereby the arms 6 will be normally disposed to their effective positions. In order to provide means for the disposition of these arms to their ineffective positions and at the same time permit the trolley wheel and adjunctive parts to be drawn downwardly, a cable 15 is engaged with the linking members at their pivotal point.

In practice, assuming that the device is in its effective position, should it be desired to remove the trolley wheel from its engagement with the conductor, it will be only necessary to draw downwardly upon the cable 15 which action will obviously cause the arms 6 to be swung on their pivots and dispose the upper ends thereof outwardly. The outward disposition of the upper ends of the arms 6 will, of course, entirely dispose the guard to its ineffective position and a continued pulling of the cable 15 will draw the trolley wheel and other parts connected therewith to the position desired. It will be appreciated however, that when the trolley wheel is effectively engaged with the conductor and the arms 6 are disposed to their effective positions over said conductor said wheel is not adapted for disengagement during the motion of the car.

From the foregoing it will be seen that I have provided a simple, inexpensive and efficient means for carrying out the objects of the invention and while I have particularly described the elements best adapted to perform the functions set forth, it is obvious that various changes in form, proportion and in the minor details of construction such as fall within the scope of the claims may be resorted to without departing from the spirit or sacrificing any of the principles of the invention.

Having thus described this invention, what I claim is:—

1. In a device of the class described, the combination with a trolley harp, bearings formed on the outer faces of the arms thereof, and a trolley wheel rotatably mounted between the arms of said harp; of a pair of arms angular in longitudinal section and pivoted intermediate the ends thereof to the bearings on said harp, said arms having portions thereof extending above and below the trolley wheel and the extreme upper ends thereof being bent inwardly toward one another, said inwardly bent ends of the arms being provided with rollers adapted to contact with one another, the downwardly extending portions of said arms being arcuately designed, arcuate linking members pivotally connected to the lower ends of said arms and also pivoted together, spring means connecting said harp to the point of pivotal connection between said linking members to normally retain the rollers at the upper ends of said arms in contact with one another, said linking members in normal position with the arms being continuations of the arcs described by the arcuate lower sections of said arms, and means engaged with said linking members to draw the same downwardly against the tension of said spring, to swing said arms to their ineffective positions.

2. In a device of the class described, the combination with a trolley harp, bearings formed on the outer faces of the arms thereof, the axes of said bearings being disposed in planes substantially parallel with the arms of said harp, and a trolley wheel rotatably mounted between the arms of said harp; of a pair of sectional arms angular in longitudinal section, the one section of each arm having an angular portion thereof reduced in diameter and extended through a bearing on the harp, the other section of each arm being removably engaged with the end of the reduced portion of the aforesaid arm, said first mentioned section of each arm being extended to a point above the trolley wheel and bent inwardly, and the last mentioned section of each arm depended to a point below said trolley wheel, rollers carried on the inwardly bent upper ends of said arms and adapted to contact with one another, linking members pivotally connected to the lower ends of the lower sections of said arms, said linking members being also pivoted to one another at their opposite ends, spring means connected to said trolley harp and also to the point of pivotal connection between the linking arms to normally retain said arms in such position as to allow the rollers at the upper end thereof to contact with one another, and means engaged with said linking members whereby the same may be drawn against the tension of said spring to dispose said arms to their ineffective position.

In testimony whereof I hereunto affix my signature in the presence of two witnesses.

GEORGE ZELLER.

Witnesses:
JOHN STIDL,
JOHN H. GIBSON.

Copies of this patent may be obtained for five cents each, by addressing the "Commissioner of Patents, Washington, D. C."